United States Patent
Kuhl et al.

(10) Patent No.: US 7,767,928 B2
(45) Date of Patent: Aug. 3, 2010

(54) DEPTH MEASUREMENT AND DEPTH CONTROL OR AUTOMATIC DEPTH CONTROL FOR A HOLLOW TO BE PRODUCED BY A LASER PROCESSING DEVICE

(75) Inventors: Michael Kuhl, Füssen (DE); Peter Wrba, Unterthingau (DE); Peter Hildebrand, Nesselwang (DE); Martin Reisacher, Kempten (DE)

(73) Assignee: Lasertec GmbH, Pfronten (DE)

( * ) Notice: Subject to any disclaimer, the term of this patent is extended or adjusted under 35 U.S.C. 154(b) by 0 days.

(21) Appl. No.: 10/935,823

(22) Filed: Sep. 8, 2004

(65) Prior Publication Data
US 2005/0029237 A1    Feb. 10, 2005

Related U.S. Application Data

(62) Division of application No. 09/806,410, filed on Sep. 5, 2001, now Pat. No. 6,861,616.

(51) Int. Cl.
B23K 26/36    (2006.01)

(52) U.S. Cl. .............................. 219/121.69; 219/121.83

(58) Field of Classification Search ............ 219/121.61, 219/121.62, 121.68, 121.69, 121.71
See application file for complete search history.

(56) References Cited

U.S. PATENT DOCUMENTS

| | | | |
|---|---|---|---|
| 3,591,761 A * | 7/1971 | Bederman et al. ........... 219/69.2 |
| 3,612,693 A * | 10/1971 | Stetson ........................ 356/458 |
| 4,119,900 A * | 10/1978 | Kremnitz ..................... 701/23 |
| 4,337,442 A * | 6/1982 | Mauck ......................... 372/13 |
| 4,370,705 A * | 1/1983 | Imazeki et al. ................ 700/79 |
| 4,381,441 A * | 4/1983 | Desmarais et al. ..... 219/121.69 |
| 4,448,680 A * | 5/1984 | Wilks et al. .................. 209/564 |
| 4,608,480 A * | 8/1986 | Bizot et al. .............. 219/121.7 |
| 4,734,158 A * | 3/1988 | Gillis .......................... 438/710 |
| 4,761,535 A * | 8/1988 | Lawson ................. 219/121.68 |
| 4,975,141 A * | 12/1990 | Greco et al. ................... 216/60 |
| 4,977,512 A * | 12/1990 | Nakagawa ................... 700/195 |
| 4,986,664 A * | 1/1991 | Lovoi .......................... 356/608 |
| 5,003,987 A * | 4/1991 | Grinwald ..................... 600/547 |
| 5,055,696 A * | 10/1991 | Haraichi et al. .......... 250/492.2 |
| 5,059,761 A * | 10/1991 | Koegl et al. ............ 219/121.83 |
| 5,139,904 A * | 8/1992 | Auda et al. .................... 430/30 |
| 5,197,074 A * | 3/1993 | Emmons et al. ............... 372/26 |
| 5,223,914 A * | 6/1993 | Auda et al. .................. 356/630 |

(Continued)

FOREIGN PATENT DOCUMENTS

DE    2426540 A  * 12/1975

(Continued)

*Primary Examiner*—Samuel M Heinrich
(74) *Attorney, Agent, or Firm*—Wood, Herron & Evans, LLP

(57) ABSTRACT

According to a method for a depth measurement the depths of measuring points on a calibration surface are measured and correction values depending on differences between the measured values and known values are used and stored for a later correction. According to a method for the layer-wise production of a hollow the horizontal boundaries $(x_g, y_g)$ for the removal of a layer $(S_{i+1})$ depending on the hollow depth (z) were determined from the shape definition of the hollow. The measured values can be continuously stored and used for a later control of the laser processing device.

17 Claims, 7 Drawing Sheets

U.S. PATENT DOCUMENTS

| | | | | |
|---|---|---|---|---|
| 5,291,393 | A | * 3/1994 | Matsumoto et al. | 700/86 |
| 5,358,806 | A | 10/1994 | Haraichi et al. | 430/5 |
| 5,362,356 | A | * 11/1994 | Schoenborn | 216/60 |
| 5,373,135 | A | * 12/1994 | Beyer et al. | 219/121.67 |
| 5,376,770 | A | * 12/1994 | Kuhl et al. | 219/121.83 |
| 5,414,939 | A | * 5/1995 | Waugaman | 33/522 |
| 5,460,758 | A | * 10/1995 | Langer et al. | 264/401 |
| 5,463,202 | A | * 10/1995 | Kurosawa et al. | 219/121.83 |
| 5,475,613 | A | * 12/1995 | Itoga et al. | 702/39 |
| 5,483,037 | A | * 1/1996 | Mashburn | 219/121.68 |
| 5,602,483 | A | * 2/1997 | Uhling et al. | 324/601 |
| 5,621,750 | A | * 4/1997 | Iwano et al. | 372/96 |
| 5,665,134 | A | * 9/1997 | Kirby et al. | 65/61 |
| 5,718,036 | A | * 2/1998 | Oji et al. | 29/603.12 |
| 5,720,894 | A | * 2/1998 | Neev et al. | 216/65 |
| 5,788,871 | A | * 8/1998 | Huh | 216/84 |
| 5,811,754 | A | * 9/1998 | Nakatani et al. | 219/121.83 |
| 5,830,376 | A | * 11/1998 | Bohlke et al. | 216/65 |
| 5,897,797 | A | * 4/1999 | Drouillard et al. | 219/121.68 |
| 5,968,382 | A | * 10/1999 | Matsumoto et al. | 219/121.72 |
| 6,043,452 | A | * 3/2000 | Bestenlehrer | 219/121.62 |
| 6,086,366 | A | * 7/2000 | Mueller et al. | 433/29 |
| 6,156,030 | A | * 12/2000 | Neev | 606/10 |
| 6,215,094 | B1 | 4/2001 | Dausinger et al. | 219/121.62 |
| 6,369,356 | B1 | * 4/2002 | Beck et al. | 219/121.83 |

FOREIGN PATENT DOCUMENTS

| | | |
|---|---|---|
| DE | 31 17 556 A1 | 5/1982 |
| DE | 40 11 780 C1 | 9/1991 |
| DE | 4027274 A * | 3/1992 |
| DE | 42 00 632 A1 | 7/1993 |
| DE | 42 06 499 A1 | 9/1993 |
| DE | 42 09 933 C2 | 8/1994 |
| JP | 363101092 A * | 5/1988 |
| JP | 4-190991 A | 7/1992 |
| JP | 405200575 A * | 8/1993 |
| JP | 5-261578 A | 10/1993 |
| JP | 10-508256 A | 8/1998 |
| WO | WO9509713 * | 9/1994 |
| WO | WO9509713 A1 * | 4/1995 |

* cited by examiner

FIG. 1
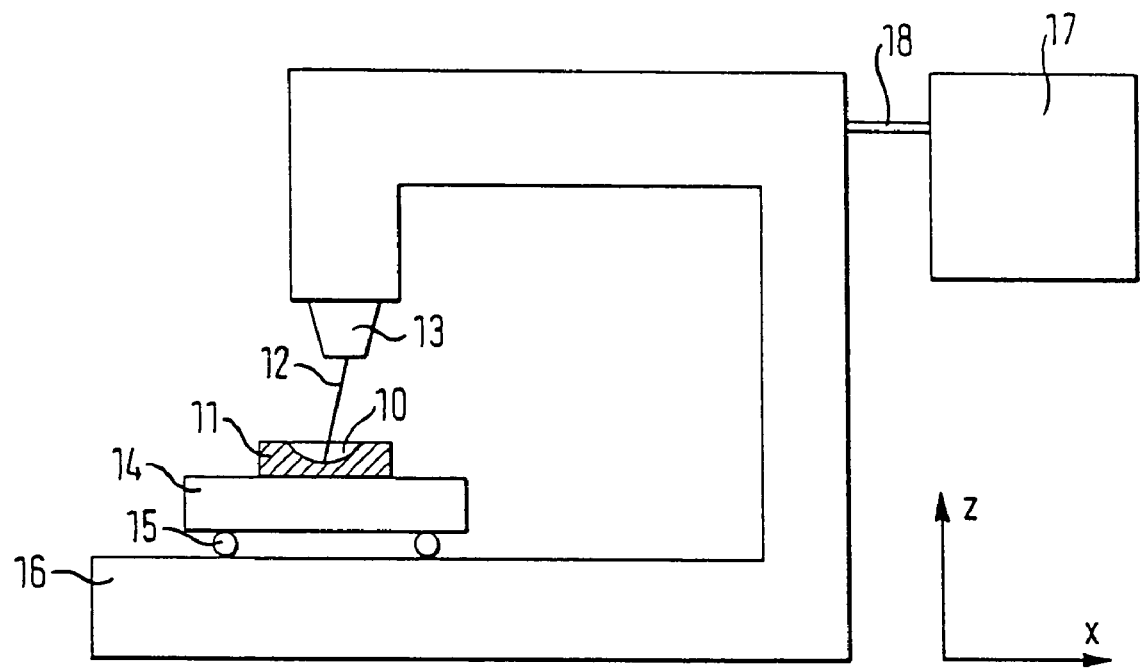
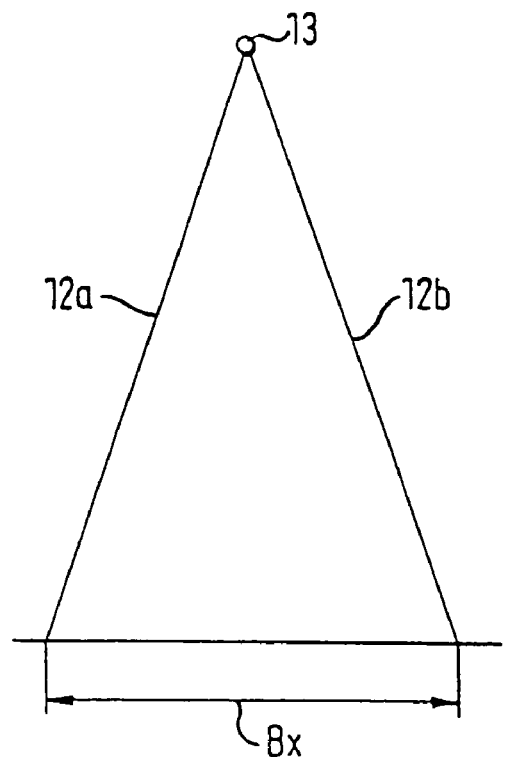

DEPTH MEASUREMENT AND DEPTH CONTROL OR AUTOMATIC DEPTH CONTROL FOR A HOLLOW TO BE PRODUCED BY A LASER PROCESSING DEVICE

This application is a divisional of U.S. patent application Ser. No. 09/806,410, filed Sep. 5, 2001, now U.S. Pat. No. 6,861,616, the disclosure of which is hereby incorporated herein by reference in its entirety.

The invention, in the most general sense, relates to the depth measurement and the depth control or automatic depth control of a hollow to be produced by a laser processing device.

A depth measuring system is known from the DE OS 42 06 499. In this case an incoherent process light is analysed, for example by a triangulation method or by analysing the distance between different reflections of the light spot.

For representing the light spot on a sensor or a sensor array a lens is required. Since the light spot may be disposed on any position in the working area Bx, By, it has to be taken care that focusing is sufficiently accurate in all positions of the light spot in the working area of the laser processing device.

Conventional lenses have a spherical focal surface. Since the surface currently worked by the laser processing device, however, is generally not spherical, a slight defocusing will therefore always occur. So-called Fθ-lenses are corrected so that they have a flat focal surface. However, this focal surface also is not completely plane so that defocusing may occur. Depending on the desired measuring accuracy such lack of definition may lead to an unacceptable loss of accuracy. The mentioned Fθ-lenses enable measuring accuracies in the range of about 100 µm. The inaccuracy of the focal plane of said Fθ-lenses is also in this range. In modern laser processing devices, however, production accuracies of a few micrometers are obtainable or controllable. Then, however, correspondingly accurate measuring systems are also required which, in particular, should be about as accurate as the production accuracy. The required accuracies can not be obtained with the measuring system known from the DE 42 06 499. This is particularly true when the measuring system is integrated in the processing system, and especially when both use the same optics. The process light used for the measurement then passes through a comparably wide section of the imaging system so that the mentioned inaccuracies will clearly occur. They may be in the range of tenths of millimetres.

From the DE 42 09 933 a method for partially changing the surfaces of metallic and non-metallic bodies with an Nd:YAG-laser is known. A substance removal in the depth direction is not described therein.

The formation of hollows by means of laser processing devices has so far been effected by carrying out a layer-wise removal of substance. The layer thickness is respectively predetermined and will be controlled. This results in the drawback that performance reserves need to be provided to ensure that the target control can safely be obtained in any case. In addition, known methods have the disadvantage that for a depth control the success of the control is effected in another position than the measuring position. This is due to the processing speed of the controller and the guiding speed of the laser beam. During the processing period the laser beam is moved ahead so that the control result occurs locally displaced. This tends to apply also to further layers so that difficulties concerning the depth control may occur.

It is the object of the invention to provide a method and an apparatus for an exact depth measurement and for an accurate depth control in laser processing devices.

Said object is solved by the features of the independent claims. Dependent claims are related to preferred embodiments of the invention.

An exact depth measurement can be obtained by calibrating the actual sensor system particularly for the optics used. To this end a known calibration surface, preferably a plane, is measured. The actual values will then be compared with the known values, and correction values for the respective position in the working area will be generated and stored in accordance with the difference.

In the present description it is assumed that the depth of the hollow extends in the z-direction of a rectangular coordinate system while the working area is a plane extending substantially in the x-y-plane of the coordinate system (see FIG. 1). For the working area Bx, By thus a two dimensional correction field is determined which may then be used for the correction of the actual measurements.

Instead of working with fixed layer thicknesses like in the case of the state of the art, it is also possible to determine the current depth z of the hollow and to determine the boundaries in the x- and y-directions for a following, particularly the next layer to be removed, from the definition of the shape to be produced depending on said absolute hollow depth. In the case of a form converging in tub-shape towards the bottom it might, for example, be found that during the removal of one layer the material was penetrated deeper than intended. In the next layer then narrower boundaries would be set in the x- and y-directions.

A further enhancement of the accuracy will be obtained when not only the absolute depth of the hollow is taken into consideration in calculating the boundaries in the horizontal direction for the next layer but also the layer thickness currently removed with the currently used parameters. With said layer thickness Az a more accurate progress in the z-direction of the shape definition is achievable so that, correspondingly, more accurate boundaries may be calculated for the next layer.

To obtain "a priori" information for the control of the apparatus the continuously determined depth measurement values may be stored, particularly in accordance with their x- and y-coordinate values. The so stored information may be used in the further progress to take appropriate measures.

It is to be explicitly noted here that applicants have filed another application relating to a method and apparatus for processing a workpiece with a laser at a date very close to the application date of the present patent application, namely U.S. Ser. No. 09/806,353, filed May 18, 2001. Herein and if required below in the following text, said application ace is explicitly referred to.

Below individual embodiments of the invention are described with reference to the appended drawings in which:

FIG. 1 is a schematic view of a laser processing device;

FIG. 1 is a schematic view of a laser processing device. If required the description will be given with reference to the mentioned rectangular x-y-z-coordinate system, x and z being shown in the plane of the drawing and y extending downwards through the plane of the drawing.

Figure 6:
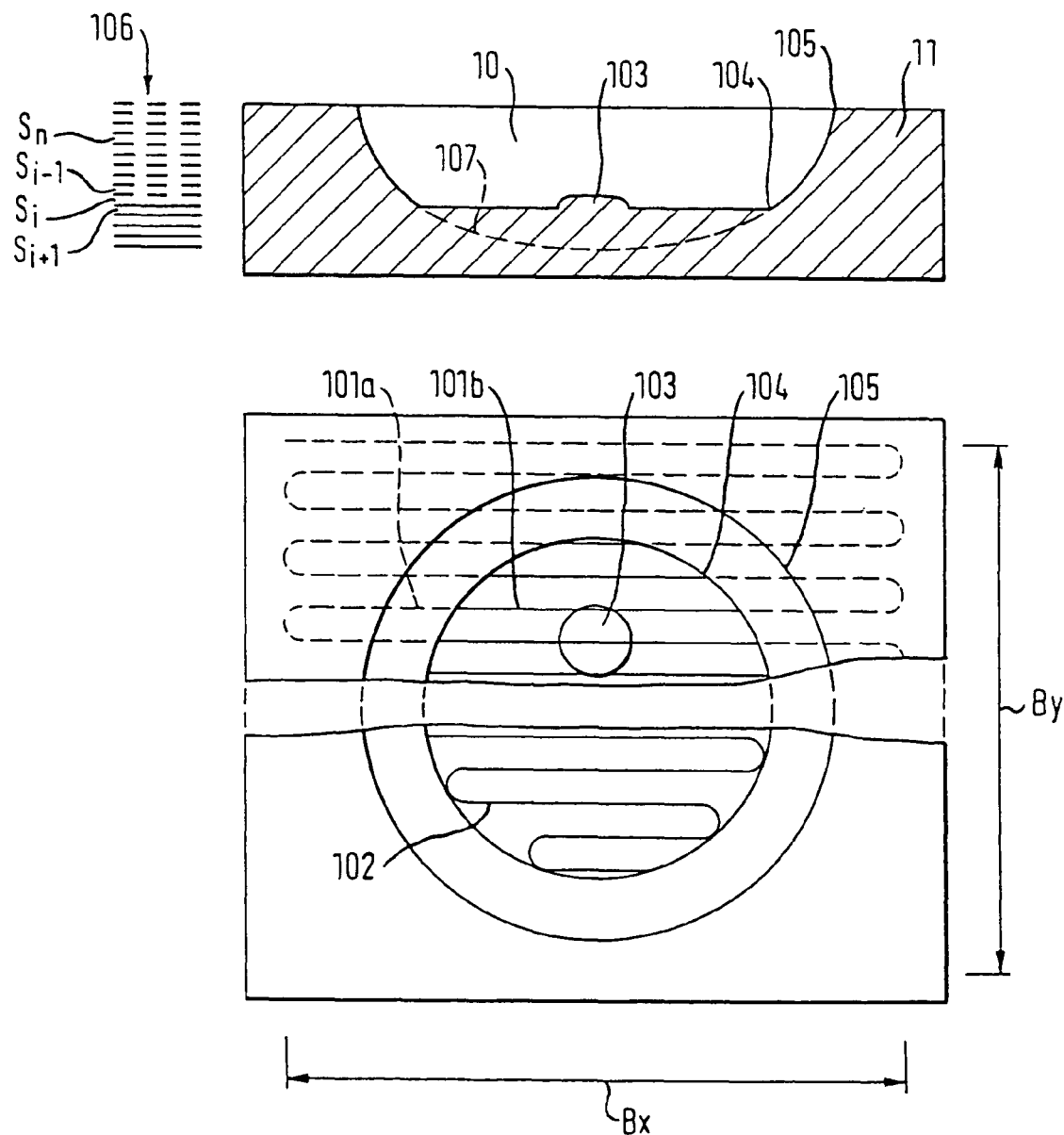
FIGS. 6 and 7 are a plan view and a cross sectional view schematically showing a workpiece for discussing general considerations.

A column 16 carries a working head 13 and a workpiece table 14 which is shiftable if required. In general a relative movement between the head 13 and the workpiece 11 is possible at least in the x-y-plane. This is indicated by rollers 15 between the workpiece table 14 and the foot 16. Instead or in addition the head 13 may also be movable. In the workpiece 11 a hollow 10 is formed. The hollow is generated by means of a laser beam 12. As a rule, a layer-wise removal of substance is carried out by successively removing layers respectively located in different positions in the z-direction and extending in the x-y-plane from the top to the bottom. In FIG. 6 this is schematically shown: In the upper part of the cross sectional view a line 107 shows the desired final shape together with the visible contours. Said final shape is generated by a layer-wise removal of substance. The layers are indicated in the illustration 106. The broken lines show layers already removed while the continuous lines indicate layers yet to be processed. The currently processed layer is denoted by $S_i$, the previous layer by $S_{i-1}$, the following layers by $S_{i+1}$. Combinations of the mentioned possibilities are also possible.

For removing a layer different strategies are feasible: Within the working area Bx, By of the head the laser beam is guided across the surface by a suitable laser beam guidance. Meandering embodiments are shown. In the upper part of the plan view an embodiment is shown in which the beam guidance principally scans the whole working area Bx, By, the laser beam being turned on only when it scans a surface to be processed, i.e. the bottom of the hollow 10. That corresponds to the continuous lines 101b, while the broken lines 101a indicate the "dark path". In the lower part of the plan view, on the other hand, an embodiment is shown in which the laser beam guidance guides the laser only across the surfaces to be processed, i.e. across the current bottom of the hollow. When a layer $S_i$ is removed, the process is continued with the removal of the next layer $S_{i+1}$.

The working area Bx, By is generally limited by constructional conditions. In general rectangular areas are concerned outside of which the laser beam can no longer be guided. In the lower part of FIG. 1 this is schematically shown. Here the working head is assumed to be a spot light source 13. The deflection of the beam may be effected between a farthest possible left position 12a and a farthest possible right position 12b. Therewith an area Bx in the x-direction is obtained. The same applies analogously to the y-coordinate.

The apparatus of FIG. 1 is provided with a controller 17 which is connected to the processing device via lines 18. The control unit 17 (which will simply be referred to as controller below) may be compact or formed spatially distributed. It will generally comprise digital components, for example a process computer.

Figure 2:
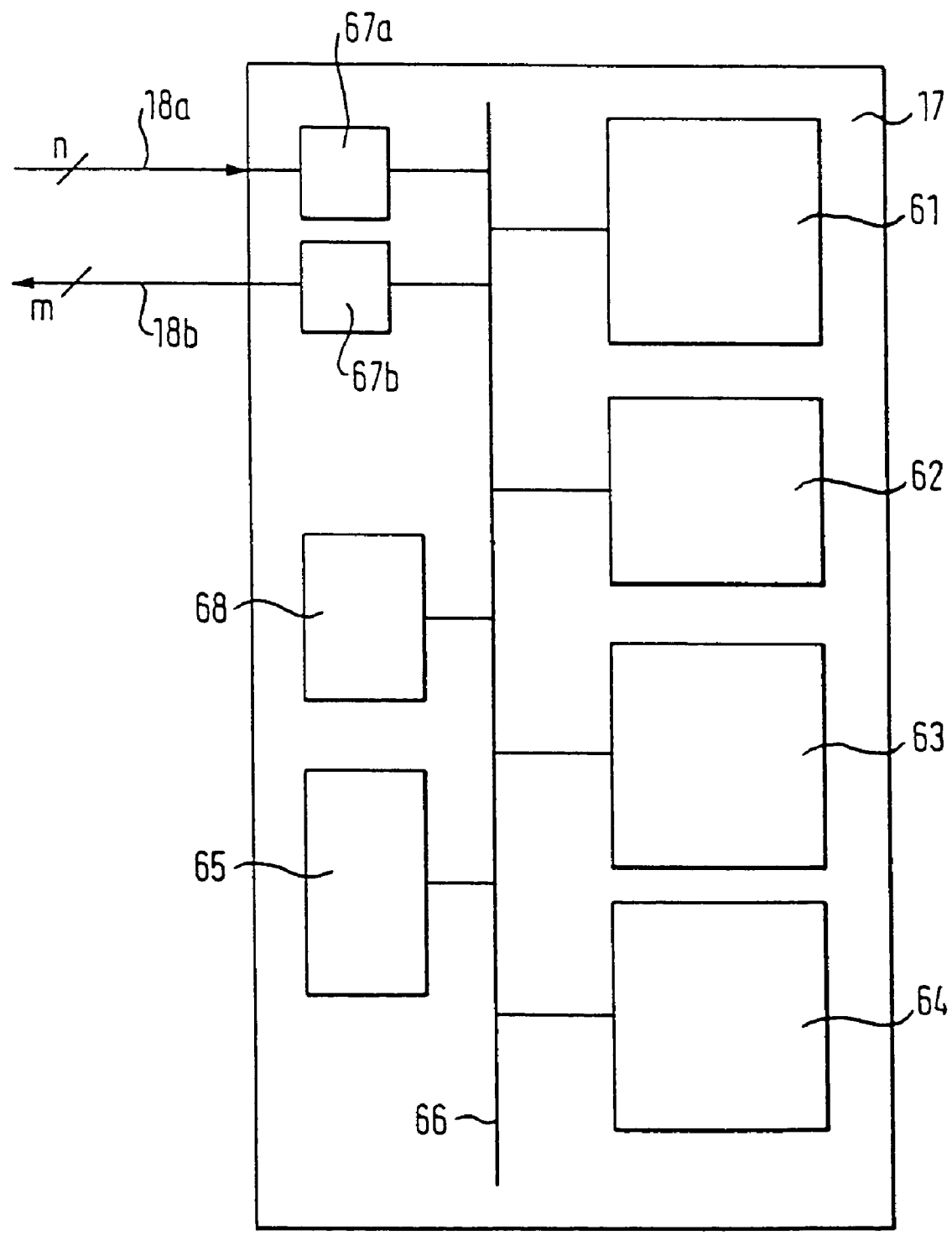
FIG. 2 is a schematic functional block diagram of a controller.

FIG. 2 schematically shows a functional block diagram of the construction of the controller 17. N signal input lines 18a and m signal output lines 18b are provided. They pass driver/coupling/converter/processing components 67a, 67b which carry out conversions related to data formats, performance and the likes. The controller 17 comprises at least one memory 64 in which different kinds of data can be stored. In addition, different general control or automatic control functions 65 are provided (for example for laser scanning, laser beam guidance, etc.). 68 denotes functions corresponding to the functions and features described in U.S. Ser. No. 09/806,353 mentioned above. They may be provided together with the functions according to the invention and may have advantageous effects. 66 denotes a channel enabling the required communication between the individual ones. As far as it is to be regarded as hardware it may, for example, be a bus of a computer.

61 denotes the function of a depth measurement according to the invention, 62 denotes a control function for determining the processing boundaries in a layer $S_i$ according to the invention, and 63 denotes a function for storing and later analysing the measured values according to the invention. The functions 61-63 operate with at least the memory 64 and with other functions depending on the requirements. They may also interact with the functions 68 described in the two other applications.

Figure 3:
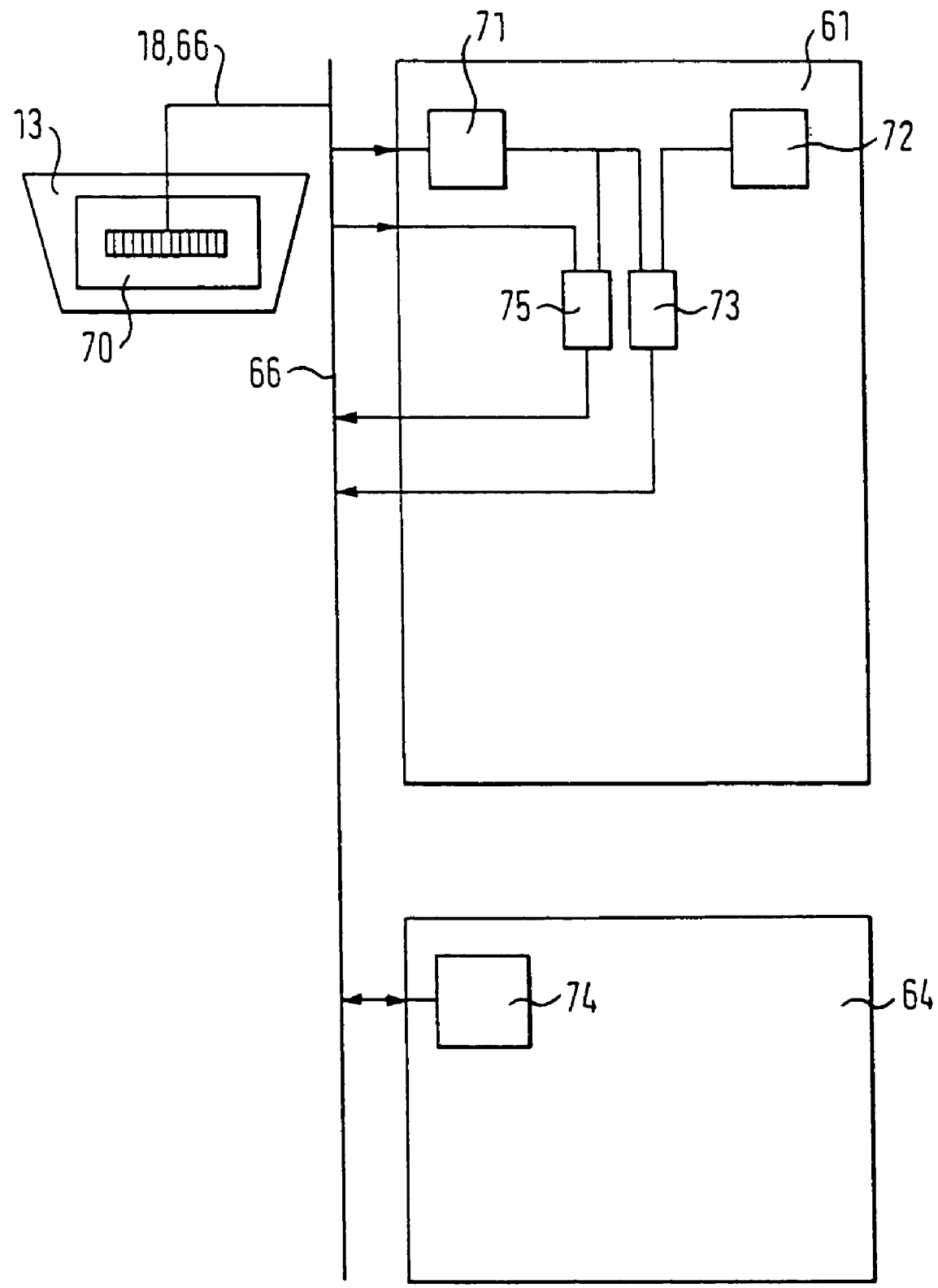
FIG. 3 shows the depth measuring device of FIG. 2.

FIG. 3 shows an exemplary embodiment of a depth measuring device. Numerals corresponding to the ones used in the previous drawings denote identical components. An embodiment is shown in which the primary sensor 70 is spatially integrated with the working head 13 (for emitting the processing laser beam). In particular the process light analysed by the sensor 70 at least partially passes the same optics as the working laser beam. A line sensor is shown which receives an image of the light spot on the working position on the workpiece 11 just illuminated by the laser beam. The measuring principle of the sensor may be as described in the DE OS 42 06 499. The sensor outputs a more or less widely spread signal which is received by the controller 17 and particularly by the depth measuring unit 61 according to the invention. 71 denotes a complex signal processing unit which transforms a comparably crude sensor signal into a depth value z (along the z-coordinate in FIG. 1).

To obtain an exact measurement the depth measuring device is calibrated previous to the actual depth measurement. To this end a calibrating surface is measured. The calibrating surface has a known shape which is preferably flat. Preferably the calibrating surface is so large that the whole working area Bx, By can be accommodated on it. In one calibrating pass the height of the calibrating surface in the z-direction is measured on different points (distributed, for example, in a grid shape) in the working area Bx, By. The so obtained measured value will be compared with the known height of the calibrating surface (denoted by 72) in a comparator 73. The difference provides a scale for the measuring error. The difference may be stored in the memory 74 depending on the position or may be used for determining a correction value to be stored depending on the position as well. "Depending on the position" in this connection means depending on the position in the x- or y-directions within the working area Bx, By. The x- and y-coordinates are known to the controller 17 from the general functions 65.

During the calibrating process thus a plane correction field is stored which may than be used for correcting the actually measured values. This is symbolised by a component 75. It receives an actually measured value via the sensor 70, lines 18, 66 and a signal former 71. In addition, it receives a correction value corresponding to the depth measurement position in its position from the memory 74. In the correction device 75 the measured value is corrected and output or held for other system functions. The correction may be carried out by addition and/or by multiplication. An identification field may also be provided. A correction depending on the absolute depth z may also be provided.

During the calibration process the calibration surface may be measured a plurality of times while being shifted in the horizontal direction (x and/or y) between the individual measurements. In this case correction values depending on the measured values obtained for the respective position x, y in the working area Bx, By will be determined for the individual positions in the working area Bx, By (by averaging, interpolation or the likes). For the correction of actually measured values also interpolations or averaging can be carried out, particularly when no or only a remotely located correction value exists for the current measuring position.

The calibration according to the invention or the depth measurement according to the invention enable a measuring accuracy in the range of a few micrometers, preferably below 1 μm. The correction values may, as far they are correction values obtained by addition, correspond to a value of up to 1 mm or more.

The depth measurement in the z-direction described above may but need not be used in the functions described below.

Figure 4:
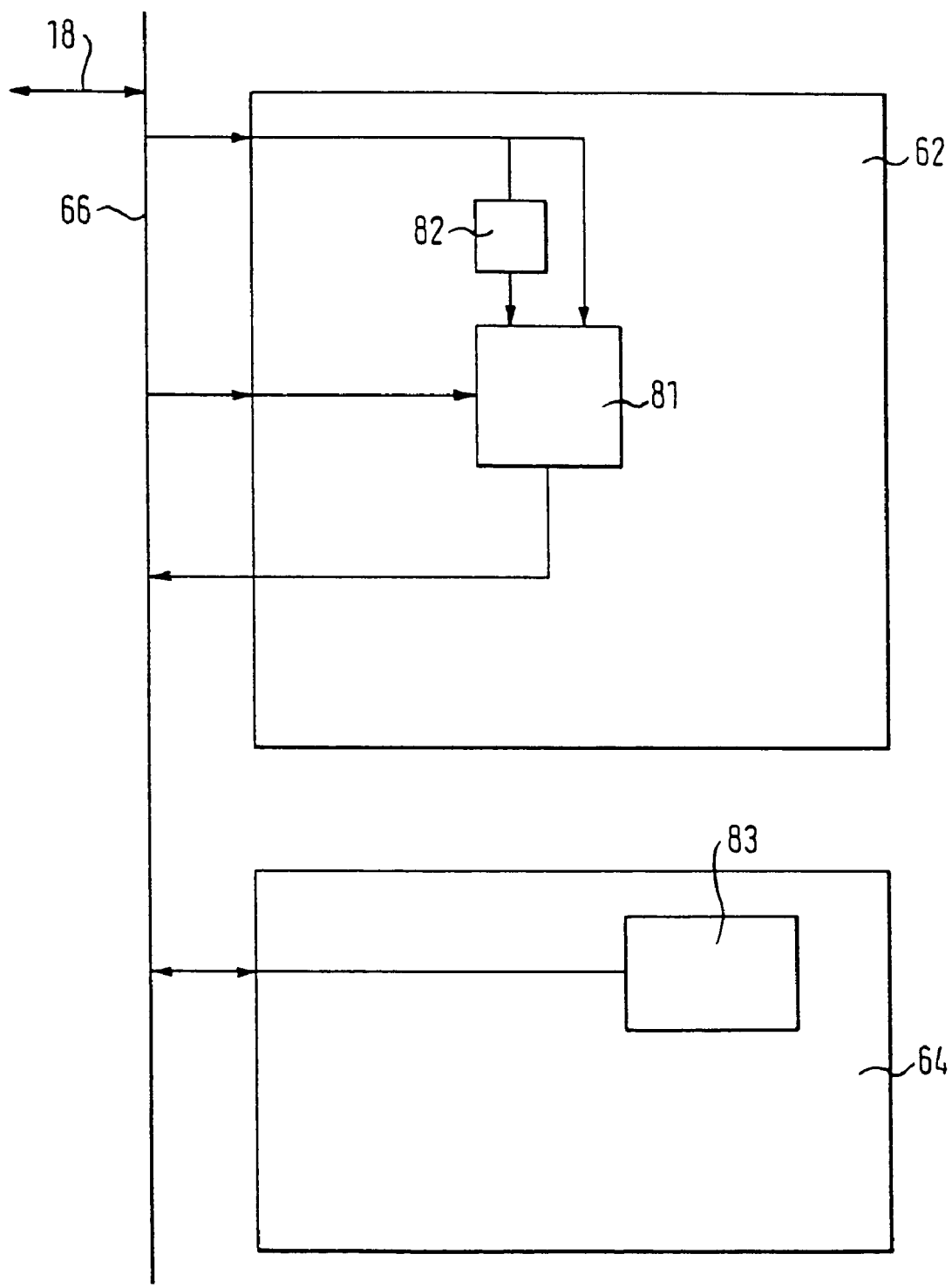
FIG. 4 shows the control unit of FIG. 2 for determining the substance removal boundaries in one layer.
Figure 7:
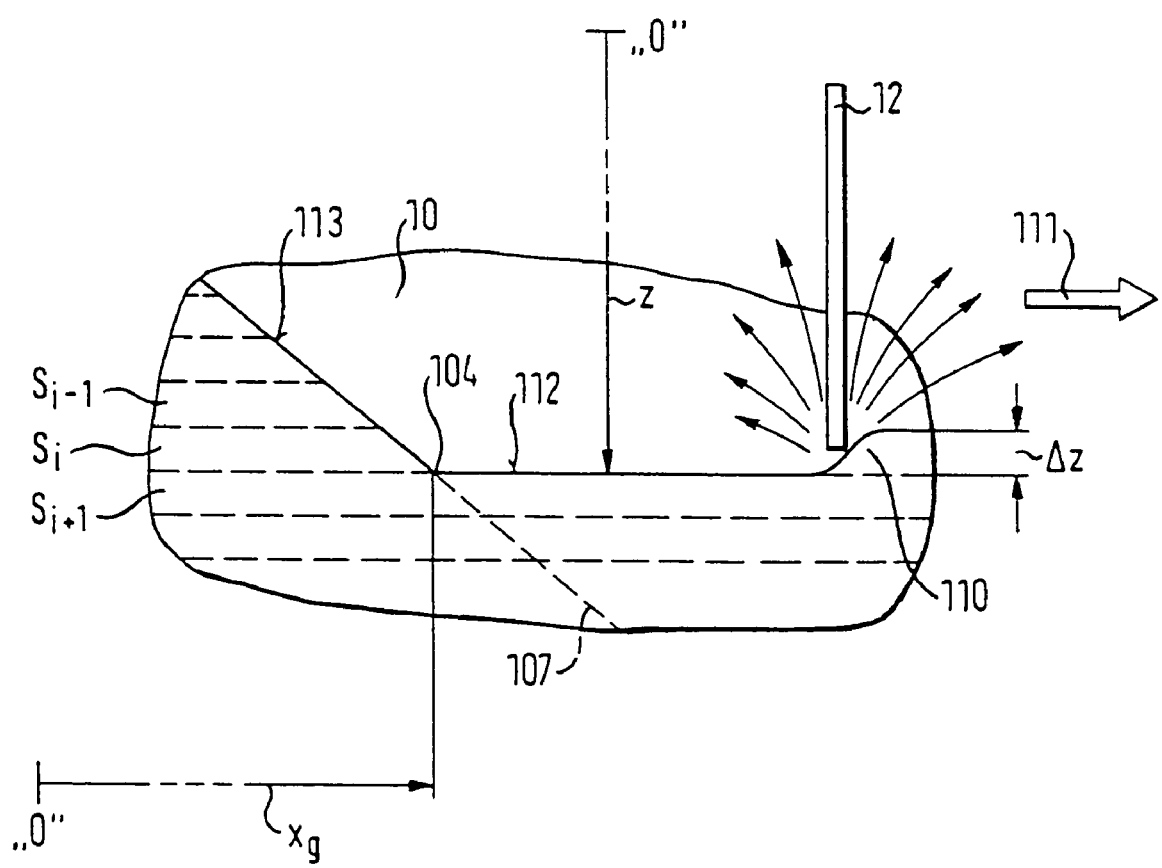

FIG. 4 schematically shows a controller for the layer removal. The basic considerations will be explained with reference to FIG. 7. Identical numerals therein denote features corresponding to the ones in the previous figures. FIG. 7 shows the laser beam 7 impinging on the bottom 112 of the hollow 10. A moving direction of the laser beam 12 in the direction of the arrow 111 (i.e. in the x-direction in this case) effected by the laser beam guidance is assumed. The material of the layer Si is vaporised and liquefied and thus removed. This is indicated by the arrows directed away from the working position 110. The thickness of a layer is assumed to be Δz, the measured absolute depth is z. The wall 113 of the hollow 10 is to follow the contour 107 in the lower layers as well. The boundary $x_g$ for the removal in the following layer $S_{i+1}$ therefore depends on the depth z particularly in the case of inclined walls, a $d_z$ will lead to a $dx_g$. As long as it is possible to set the depth z to predetermined values from layer to layer the boundaries for the layer removal in a layer $x_g$ (and correspondingly $y_g$) can also be previously set and then adjusted. That corresponds to a fixed programming of the device. It may, however, be desirable not to insist in said layer thicknesses. Sometimes it may also be technically impossible. It will then be advantageous to determine the removal boundaries in the x-y-plane for the next layer $S_{i+1}$ based on the actual depth z since a change of z will also result in a change of $x_g$ and $y_g$. This corresponds to a flexible programming. A device for realising that consideration is schematically shown in FIG. 4. It comprises a control device 81 for determining the horizontal boundaries $x_g$, $y_g$ for the substance removal in a following layer, particularly $S_{i+1}$, from the shape definition stored in a memory 83 depending of the depth z of the hollow. To this end, on the one hand, the control unit 81 receives data containing the shape definition, and, on the other hand, the depth z (or a value derived from it, for example, filtered or averaged). From said data the boundaries $x_g$, $y_g$ in the horizontal direction for the layer removal may be determined and supplied to the conventional components 65 for adjusting said values.

A further increase of the accuracy will be obtained when not only the absolute depth z but also the layer thickness Δz just removed with the current parameters is considered for determining the substance removal boundaries $x_g$, $y_g$. The calculation "into the depth of the hollow" does then not need to be carried out using a theoretical value for the layer thickness, but the currently actually removed layer thickness may be used.

When only the measured depth z (together with a theoretical value for the layer thickness) is taken into consideration for the boundary determination, the generation of a cumulative error is avoided and at most a non-cumulative error corresponding to the difference between the theoretical and the actual layer thickness occurs which may be tolerable in some cases. When the actual layer thickness Δz is also considered in the determination of the boundaries the occurance of said residual error will also be prevented.

FIG. 4 shows means 82 for determining the layer thickness. It may, for example, be designed so that it will remember measured values z of the previous layer $S_{i-1}$ and then compare these with the values measured during the removal of the layer $S_i$. The difference corresponds to the layer thickness Δz. In this case also filtered or averaged values may be used.

The definition of the shape of the hollow may, for example, be stored in the memory 83 in the form of CAD-data. The device 81 is possibly a relatively complex structure which can calculate intersection edges between a plane (corresponding to a value of z+Δz) and a shape (corresponding to the shape definition of the hollow) from the kind of data stored in the memory 83.

Figure 5:
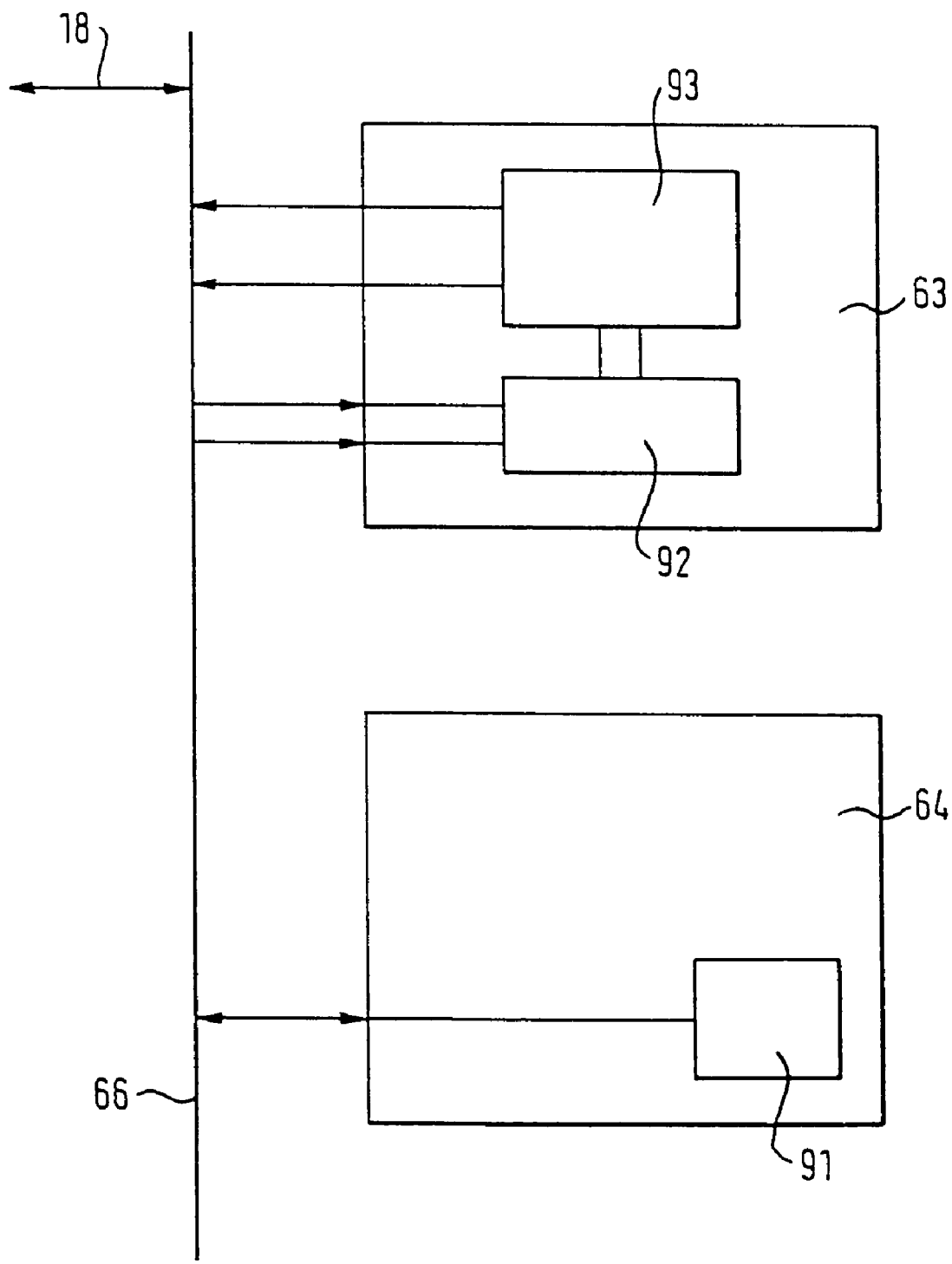
FIG. 5 shows the control unit of FIG. 2 for storing measured values.

FIG. 5 shows a function for continuously storing the continuously measured depth data z. The storage is preferably carried out in memory locations corresponding to the position of the measured location in the working area of the device. It is not always possible to produce the current bottom 112 so evenly as shown in FIG. 7. Rather, waviness or plateaux or indentations may occur. In FIG. 6 the numeral 103 denotes a plateau. Under consideration the movement of the laser beam 12 in FIG. 7 in the direction of the arrow 111 a feeding speed $v_x$ may be determined. If, on the other hand, it is assumed that the reaction speed of the system is limited to one measurement, a time $t_R$ can be determined as a reaction period which will pass until a measured value of z can have an effect on the laser 12. Due to the reaction time $t_R$ and the feeding speed $v_x$ control interventions will principally become effective with a spatial offset. That corresponds to a dead time under a control technical aspect. In disadvantageous cases oscillations (waviness) may occur. The offset corresponds to $x=v_x \cdot t_R$ and is therefore absolutely included in the range of the observed accuracies (e.g. $v_x$=01 m/s, $t_R$=0.5 ms, x=50 μm). To compensate such disadvantageous effects it may be desirable to store measured values for the depth z and to take them into consideration later. This may lead to control overlapping or underlying the automatic control depending on the stored depth data.

When the depth z is measured continuously or quasi-continuously it may also be continuously written into a memory 91 and used in a suitable manner later. A topography or topographic mapping of the current hollow bottom will then be generated in the memory 91, said mapping being a tabular reflection of the respectively measured depth values z. The density of the measuring points on the surface towards high values is limited in the feeding direction of the laser beam by the feeding speed $v_x$ and the reaction time $t_R$ and can be selected below said limits. In the case of a meandering surface coverage according to FIG. 7 the density of the measuring points is determined by the track distance of the meanders in the direction transverse to the feeding direction.

When the topographical mapping or the topography indicates, for example, a plateau 103, this a priori information may be used for leveling out said irregularity without the temporary offset due to the reaction time of the system preventing the error correction. Owing to the priori information the interaction parameters of the laser can be changed (towards a stronger substance removal in the case of, plateaus, towards a weaker substance removal in the case of indentations) in the range of a recognised irregularity, or additional layers for removing only the irregularity (the plateau or the land around the indentation) may be inserted in the case of larger deviations.

A change of the interaction parameters of the laser beam may be effected when the laser beam passes the vicinity of the error again within the same layer (for example in the neighbouring track in the case of a meandering guidance according to FIG. 6). It is assumed here that the effect of the laser beam can not be accurately limited to one track. The effective area is rather indistinctly limited so that the laser beam incident on the current hollow bottom will not only be effective in the "ideal", currently observed track but also in the adjacent tracks. In addition the interaction parameters of the laser beam may also be changed in the following layers, for example in the next lower layer, to level out an irregularity recognised in an earlier layer.

With the described adjustment of the interaction parameters depending on the stored hollow depth data as a control the control of the laser depending on the currently measured values may be maintained. The laser, however, may also be operated depending on the currently measured values without said control so that it is controlled only depending on the stored parameters.

The topographic mapping described may advantageously be combined with the determination of the substance removal boundaries in the horizontal direction described with reference to FIG. 4. Said techniques may be used in connection with the described measuring arrangement (referencing a calibrating curve) individually or in combination. The topographic mapping method described with reference to FIG. 5 can also be used together with the method for adjusting the relative position described in the other application U.S. Ser. No. 09/806,353 of the applicant applicants. For example, the relative positions of the working head and the workpiece may be selected so that critical areas on the workpiece (for example a plateau 103 or an indentation) will not come to be located in the boundary sections of the working area of the device so that a reliable processing of the corresponding position will become possible.

The invention claimed is:

1. A method for making a specifically formed hollow in a work piece by means of a laser machining apparatus which, in a layer-wise manner, removes material from the work piece in horizontal layers, wherein the horizontal boundaries of the hollow change in at least one layer, the method comprising:
   continuously measuring a depth of the hollow being formed; and
   determining the horizontal boundaries to be removed in the next subsequent layer based on the measured depth of the current layer of the hollow and a form definition of the hollow.

2. Method according to claim 1, characterized in that the thickness of a removed layer is determined from measured depths of the hollow, and the boundaries in horizontal direction for removal in a subsequent layer is determined also in accordance with a determined layer thickness from the form definition of the hollow.

3. Method according to claim 1, wherein boundaries of removal in a layer are determined with reference to stored form data of the hollow.

4. A method for forming a specifically formed hollow in a work piece by means of a laser machining apparatus which removes, in a layer-wise manner, material of the work piece in accordance with a defined shape, the method comprising:
   continuously measuring the depth of the hollow;
   continuously storing the measured depth together with respective coordinates or at memory locations corresponding to the respective coordinates; and
   controlling the laser machining apparatus during removal of subsequent layers based on the stored depth.

5. Method according to claim 4, characterized in that a stored measured value is used when, within the same layer, the laser is near a site corresponding to the measured valued and/or when, in a subsequent layer, the laser is at or close by a site corresponding to the measured value.

6. Method according to claim 4, characterized in that a measurement value is used for adjusting instantaneous or future interaction parameters of a laser beam.

7. Method according to claim 6, characterized in that for a pulsed laser a laser amplitude and/or an impulse elevation and/or a duty ratio are adjusted.

8. Method according to claim 4, characterized in that the stored measured values are used for removing a partial layer.

9. Method according to claim 4, in which for measuring the depth with a depth sensor a light emanating from a working site is used, characterized in that the depth sensor is calibrated,
   a depth is measured at a specific site of the hollow,
   the measured value is corrected in accordance with the position of the site and with reference to correction values stored during calibration, and the corrected value is used as measured depth.

10. Method according to claim 9, characterized in that correction is made by adding a value or by multiplying a value.

11. Method according to claim 9, characterized in that a correction is made in accordance with the depth of the hollow.

12. Method according to one of the claim 9, wherein for calibrating the depth sensor the depth of measurement points on a calibrating surface with known shape are measured,
   measured values are compared with known values at the respective measurement point of the calibrating surface, and
   correction values are stored in accordance with a difference between the measured value and the known value together with the respective coordinates or at memory locations corresponding to the respective coordinates.

13. Method according to claim 12, characterized in that for depth measurement the sensor uses a light emanating from the working site, and that laser light is guided through a laser beam guidance across the surface of the work piece within a working area defined by the apparatus.

14. Method according to claim 12, characterized in that the calibrating surface is a plane.

15. Method according to claim 14, characterized in that the calibrating surface is measured a plurality of times, and the calibrating surface is shifted as compared to the measurement system in horizontal direction between various measurements, wherein for measurement points corresponding to each other within the working area or being close to each other correction values are formed in accordance with all measurements for said measurement point and are stored for said measurement point.

16. Method according to one of the claim 12, characterized in that the distance between measurement points in advancing direction of the laser beam is determined by the processing speed of a digital system and by the advancing speed of the laser beam.

17. Method according to claim 14, characterized in that the calibrating surface has an unevenness smaller than 5 micrometers, preferably smaller than one micrometer.

* * * * *

UNITED STATES PATENT AND TRADEMARK OFFICE
CERTIFICATE OF CORRECTION

PATENT NO. : 7,767,928 B2  Page 1 of 1
APPLICATION NO. : 10/935823
DATED : August 3, 2010
INVENTOR(S) : Kuhl et al.

It is certified that error appears in the above-identified patent and that said Letters Patent is hereby corrected as shown below:

In column 2, line 51, change "said application ace is explicitly" to --said application is explicitly--.

In column 4, line 51, change "which may than be used" to --which may then be used--.

In column 5, line 9, change "as far they are correction values" to --as far as they are correction values--.

In column 6, line 21, change "Rather, waviness or plateaux or indentations may occur." to --Rather, waviness or plateaus or indentations may occur.--.

In column 6, line 58, change "Owing to the prior information" to --Owing to the a priori information--.

In column 7, line 28, change "of the applicant applicants." to --of the applicants.--.

In column 7, line 50, claim 2, change "and the boundaries in horizontal direction for removal in a subsequent layer is determined" to --and the boundaries in horizontal direction for removal in a subsequent layer are determined--.

In column 8, line 5, claim 5, change "corresponding to the measured valued" to --corresponding to the measured value--.

In column 8, line 30, claim 12, change "Method according to one of the claim 9," to --Method according to claim 9,--.

In column 8, line 56, claim 16, change "Method according to one of the claim 12," to --Method according to claim 12--.

Signed and Sealed this

Sixteenth Day of November, 2010

David J. Kappos
*Director of the United States Patent and Trademark Office*